United States Patent

[11] 3,565,448

| [72] | Inventor | Albert W. Angelbeck<br>East Hartford, Conn. |
|---|---|---|
| [21] | Appl No | 817,460 |
| [22] | Filed | Apr. 18, 1969 |
| [45] | Patented | Feb. 23, 1971 |
| [73] | Assignee | United Aircraft Corporation<br>East Hartford, Conn. |

[54] ADJUSTABLE SEALING AND FIXTURING DEVICE
6 Claims, 4 Drawing Figs.

[52] U.S. Cl. .................................................. 277/143,
24/249
[51] Int. Cl. .............................................. F16j 15/02
[50] Field of Search.......................................... 24/249
(PP), 249 (DPE); 34/242; 211/66; 277/143, 169,
214, 31; 248/110, 113, 313 (Inquired)

[56] References Cited
UNITED STATES PATENTS
RE19,684  8/1935  Young........................ 277/31X

| 839,638 | 12/1906 | Price | 24/249(DPE) |
|---|---|---|---|
| 1,216,943 | 2/1917 | Champie | 24/249(DPE) |
| 1,529,930 | 3/1925 | Sharp | 24/249(DPE) |

Primary Examiner—William F. O'Dea
Assistant Examiner—Edward J. Earls
Attorney—Donald F. Bradley ABSTRACT: A fixturing and sealing mechanism for holding pipes or other workpieces of various sizes and at the same time affording a vacuum seal. Two arcuate or contoured members are pivoted about end walls of a vacuum chamber so that the radii of the two members abut in sealing relation. Each member contains a semicircular surface aperture of decreasing radius. By rotating the two members, circular apertures of different diameters are created by the intersection of the two members, and a seal is provided in the end wall of the chamber to accommodate different size workpieces.

PATENTED FEB 23 1971 3,565,448

INVENTOR
ALBERT W. ANGELBECK
BY Donald J. Bradley
ATTORNEY

ADJUSTABLE SEALING AND FIXTURING DEVICE

BACKGROUND OF THE INVENTION

1. Field of the Invention

This invention relates to a mechanism for holding and sealing various size pipes or rods in a vacuum chamber. The mechanism is adapted to be used with a clamp-on type of welder in which a cold cathode electron beam apparatus is utilized to weld various size workpieces.

2. Description of the Prior Art

In many applications it is desirable to weld a pipe or rod without removing it from its installation. Electron beam welding and specifically welding by cold cathode discharge is particularly useful for this type of operation. Cold cathode discharge involves the generation of electron beams by nonthermionic emission, and includes hollow cathodes and contoured cathodes which operate in a glow discharge mode.

An advantage of cold cathode discharge is that it does not require a high vacuum as do conventional electron beam devices. Another advantage is that cold cathodes may be fabricated in annular configurations which will weld a pipe, or join two pipes, in a single operation.

In this regard there is disclosed in copending U.S. Pat. application Ser. No. 711,933 entitled "Sectional Hollow Cathode Discharge Apparatus," filed Mar. 11, 1968, now U.S. Pat. No. 3,492,525, a segmented hollow or contoured cathode which is annular in configuration and which may be opened to provide access to the electron beam focal point. In one embodiment thereof a clamshell-shaped vacuum chamber surrounding the segmented cathode is provided with a hinged cover, and is adapted to provide a seal for the cathode and workpiece in the interior of the chamber. The entire structure is constructed to completely surround a fixed pipe installation and to weld the pipe without removing the pipe from its installation.

The vacuum seal provided by the above apparatus is restricted to a fixed diameter pipe, and if different size pipes are to be welded, other steps must be taken to provide an adequate seal. The seal must be able to withstand the high temperatures involved in welding operations. Also, the seal must be constructed so that it will split or separate so that the vacuum chamber can be clamped around the workpiece. The invention provides a novel seal which accomplishes these objectives.

SUMMARY OF THE INVENTION

A primary object of the present invention is an improved sealing and fixturing device for rods and pipes.

In accordance with the present invention there is provided a sealing and holding device composed of two curved members which are pivoted opposite each other about the end walls of a chamber. Each member contains a continuous or semicircular surface aperture of decreasing radius along its circumference. By rotating the two members, closed or circular apertures of different diameters are created by the intersection of the two members, and a seal is provided in the end wall of the chamber for a workpiece extending therethrough.

The sealing and holding device of this invention will provide adequate sealing for the annular cathode welding apparatus described previously, and also is useful where sealing and holding a member such as a pipe or rod is desired.

DESCRIPTION OF THE PREFERRED EMBODIMENT

Figure 1:
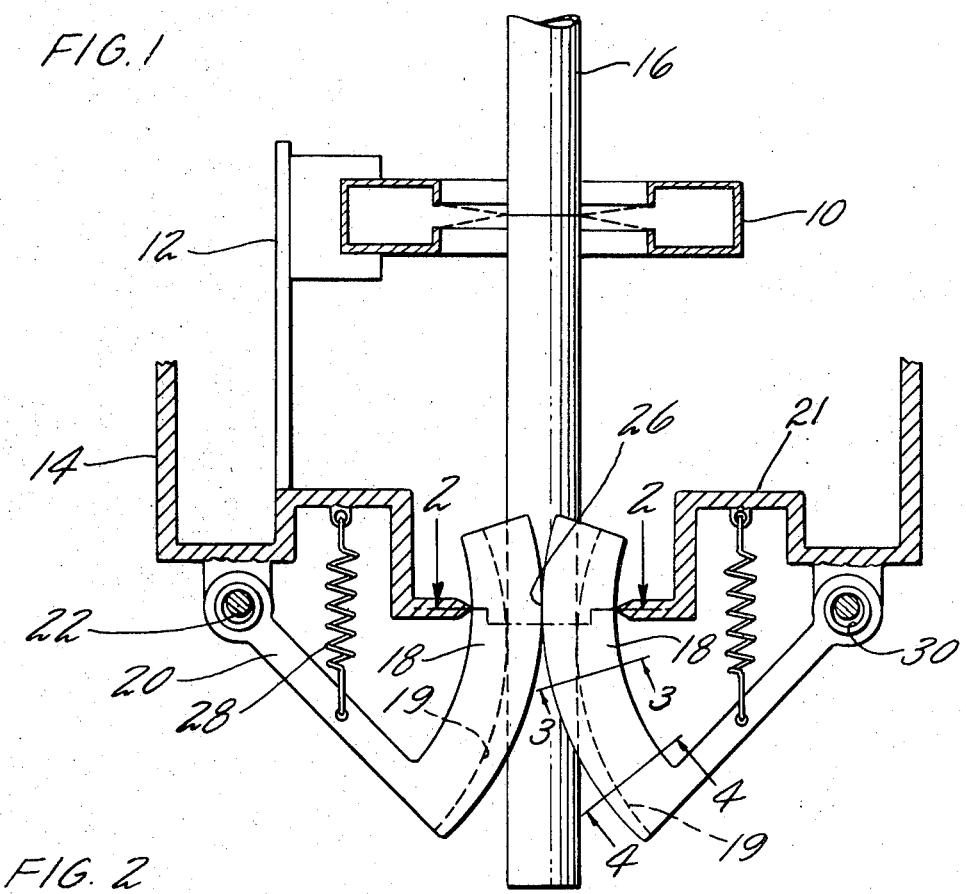
FIG. 1 illustrates in cross section a glow discharge type electron beam welder incorporating the novel sealing and fixturing device of this invention.

Referring to FIG. 1 there is shown an electron beam welding apparatus. An annular hollow or contoured cathode electron beam apparatus 10 is mounted on a support structure 12 within an enclosure comprising walls 14. The annular hollow cathode and its operation is described in detail in U.S. Pat. No. 3,381,157, and the contoured cathode is described in U.S. Pat. No. 3,430,091. A workpiece which is shown as a pipe 16 is positioned at the focal point of the annular cathode. The workpiece may consist of two pipes to be welded together. The annular cathode may be segmented and the enclosure may be hinged as shown in copending application Ser. No. 711,933.

For operation of cold cathode devices an ambient pressure in the order of several hundred millitorr is maintained within the enclosure.

The workpiece is sealed and fixtured at the ends of the enclosure by two rotatable contoured members 18 which abut in order to provide proper sealing. Each member is supported by an arm 20 which is pivoted at a point 22 along the base of the enclosure by any known means. The pivot point 22 is preferably at the center of curvature of the members 18. As shown in FIG. 1, the base of enclosure 14 to which the pivot is attached is set back slightly to permit the pivot point 22 to be located along the base line of the enclosure. The inside radius of each member 18 and the sides of each member 18 abut the edges of enclosure 14 to provide a seal as is shown at 24 in FIG. 2. Auxiliary seals may be provided between members 18 and the enclosure walls if desired to improve the sealing.

Figure 2:
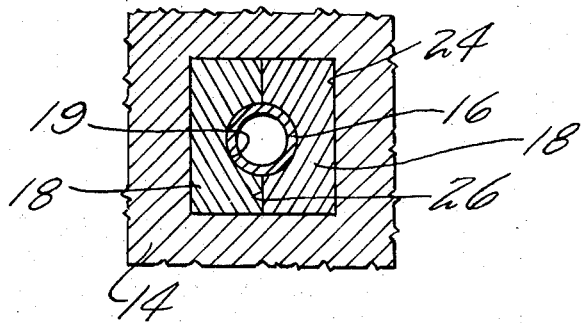
FIG. 2 is a view across 2—2 of FIG. 1.
Figure 3:
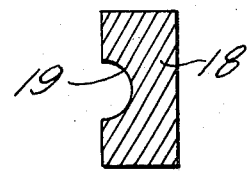
FIG. 3 is a view across 3—3 of FIG. 1.
Figure 4:
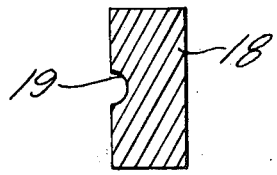
FIG. 4 is a view across 4—4 of FIG. 1.

The members 18 are contoured along their outside radius by a semicircular depression 19. As shown in FIGS. 2, 3 and 4, the radius of the semicircular depression 19 decreases along the length of the members 18. The rate of change of radius from one end of one member to the other will depend on the dimensions of the workpieces to be fixtured and the extent of the sealing required. In general, the smaller the change in radius, the better the sealing provided.

By rotating members 18 about pivot points 22, an aperture of varying diameters is produced by the intersection of the two members. Since the outside circumference of each member is circular, the members will always abut along a line 26 regardless of the amount of rotation of the members. As shown in FIG. 2, members 18 will rotate until the members fit against the workpiece 16, thereby forming a seal with the workpiece.

In order to improve the sealing, springs 28 are inserted between the arm 20 and the enclosure wall 14 to exert pressure on the members 18 and force the members 18 snugly against the workpiece. The enclosure wall is indented at 21 to provide sufficient room for springs 28 to compress. It is recognized that because the semicircular depression 19 changes in radius and depth along the length of member 18, the member 18 will not always be exactly tangent to the workpiece at the line 26 where the member 18 and the workpiece abut. In other words, the fact that the semicircular depression 19 changes in radius from one end of the member 18 to the other means that the depression 19 does not describe a radius about pivot point 22, but is in fact eccentric about point 22. The two members 18 will always abut at their outside circumference tangent to each other along the line 26 regardless of the diameter of the workpiece, but semicircular depression 19 may not be tangent to the workpiece at that point. To allow for this slight deviation, a grommet 30 is inserted into the arm portion 20 at the pivot point 22. The grommet 30 has a hole in its center larger than the diameter of the pivot 22, thereby allowing space for the member 18 to adjust in radius about pivot point 22 and compensate for the slight variation in radius of the semicircular depression 19. The tension of spring 28 will cause the members 18 to adjust to be generally tangent to the workpiece at the sealing point.

The members 18 will be constructed from a metal such as steel for high-temperature welding operation. If better sealing is required, the members can be constructed from hard rubber such as Viton. Teflon may also be used. For even better sealing, but with lower temperature limits, soft rubber such as silicon rubber may be used, and a compression seal between members 18 and the workpiece is created.

It will be obvious that the invention is not restricted to circular pipes, but may be extended to any closed regular-shaped workpiece such as square, triangular, etc. The workpiece may be solid or hollow in cross section. Likewise, the invention is not restricted to a welding operation, but may be used in any environment where it is desired to support and seal a workpiece.

The geometry of the mechanism is such that operation will be improved for larger size apparatus. That is, the longer the length of the members 18, the more closely the contact between the members 18 and the workpiece will approach tangency, and better sealing will be produced.

In addition to the sealing function of the apparatus, the workpiece is securely held in proper position for welding.

It is to be understood that the invention is not limited to the specific embodiment herein illustrated and described but may be used in other ways without departure from its spirit as defined by the following claims.

I claim:

1. A fixturing and sealing apparatus for a workpiece comprising:
   first and second arcuate shaped members having an inside and an outside circumferential portion;
   a radial arm extending from the inside circumferential portion of each of said members and being adjustably pivoted about a pivot element at its end whereby each of said members is rotatable about said pivot element in the plane of said circumferential portions;
   and a surface aperture of decreasing cross-sectional area in the outside circumferential portion of each said member, said members being mounted so that the outside circumferential portions of said members abut to form a closed aperture adapted to enclose a workpiece.

2. Apparatus as in claim 1 in which said surface aperture is simicircular and whereby said members abut to form a circular closed aperture.

3. Apparatus as in claim 1 and including means for adjusting the point at which said members abut to vary the dimensions of said closed aperture.

4. A fixturing and sealing apparatus for a workpiece comprising:
   an enclosure wall having an opening therein;
   first and second arcuate shaped members having an inside and an outside circumferential portion which inside circumferential portion forms a seal with said opening;
   a radial arm extending from the inside circumferential portion of each of said members;
   first and second pivots mounted on said enclosure wall adjacent said opening;
   an aperture in the end of each said radial arm, the aperture in each of said radial arms being mounted on one of said pivots so that each said member is rotatable about one of said pivots in the plane of said circumferential portions, said members abutting at the outside circumference thereof within said opening; and
   a surface aperture of decreasing semicircular cross-sectional area in the outside circumferential portion of each member whereby a circular aperture is formed between said members at the point where said members abut.

5. Apparatus as in claim 4 and including a spring connected between said enclosure wall and each said radial arm for adjusting the position of said members within said opening to conform to the size of the workpiece.

6. Apparatus as in claim 5 in which the aperture in each of said radial arms is circular and of larger area than the said pivots whereby the rotational axis of said members may be adjusted.